United States Patent [19]
White et al.

[11] 4,101,256
[45] Jul. 18, 1978

[54] MOLD FOR FORMING A PLASTIC ARTICLE HAVING AN UNDERCUT OR NEGATIVE DRAFT PORTION

[75] Inventors: Roger L. White, Lawrence; Richard K. Dalton, Garnett, both of Kans.

[73] Assignee: E & E Specialties, Inc., Lawrence, Kans.

[21] Appl. No.: 776,701

[22] Filed: Mar. 11, 1977

[51] Int. Cl.² .......................................... B29C 17/04
[52] U.S. Cl. .................... 425/441; 425/388; 425/DIG. 58; 249/184; 425/403
[58] Field of Search ............... 425/DIG. 58, 441, 388; 249/184

[56] References Cited

U.S. PATENT DOCUMENTS

| 2,784,455 | 3/1957 | Pulaski ............... 425/DIG. 58 |
| 3,642,416 | 2/1972 | Muller ............... 425/DIG. 58 |
| 4,030,871 | 6/1977 | Cobb ................. 249/184 X |

FOREIGN PATENT DOCUMENTS

| 1,237,243 | 6/1960 | France ............... 425/DIG. 58 |
| 1,168,056 | 4/1964 | Fed. Rep. of Germany ... 425/DIG. 58 |
| 1,249,505 | 9/1967 | Fed. Rep. of Germany ... 425/DIG. 58 |

*Primary Examiner*—J. Howard Flint, Jr.
*Attorney, Agent, or Firm*—Fishburn, Gold & Litman

[57] ABSTRACT

A mold for forming a plastic article having an undercut or negative draft portion adjacent a narrow wall spacing, such as a card rack, wherein the hollow projection extends outwardly from an article wall which is substantially normal to a rear wall of the article so that the projection and the rear wall are in facing relation. The mold is particularly adapted for vacuum forming an article and includes a mold member that may be heated and cooled to form and release a plastic article and a frame for holding peripheral edges of a plastic sheet in overlying relation with the mold and a heater for heating the plastic sheet for vacuum forming to the shape of the mold. The mold includes an undercut forming member resiliently and hingedly mounted on and extending outwardly from certain of mold portions so that the undercut forming members during initial separation of the mold from the formed article main mold member moves away from the undercut forming member and provides a cavity for retractive movement of said undercut forming member permitting pivoting and removal thereon as the mold is fully removed from the formed article, said undercut forming member automatically returning to molding position.

2 Claims, 8 Drawing Figures

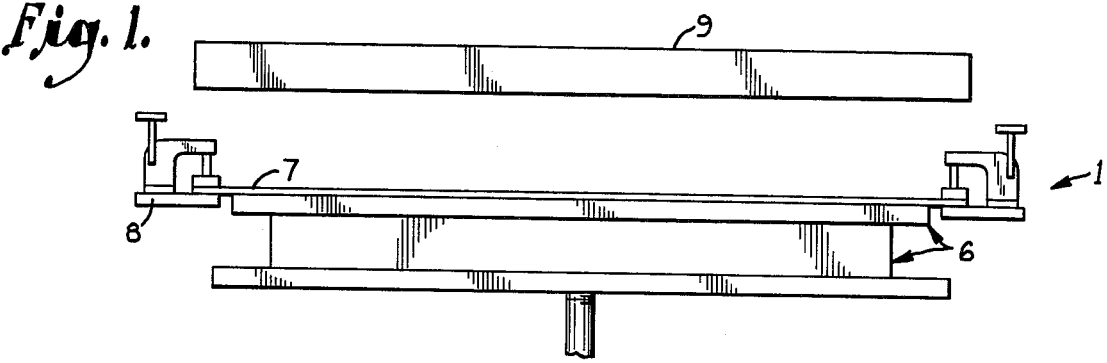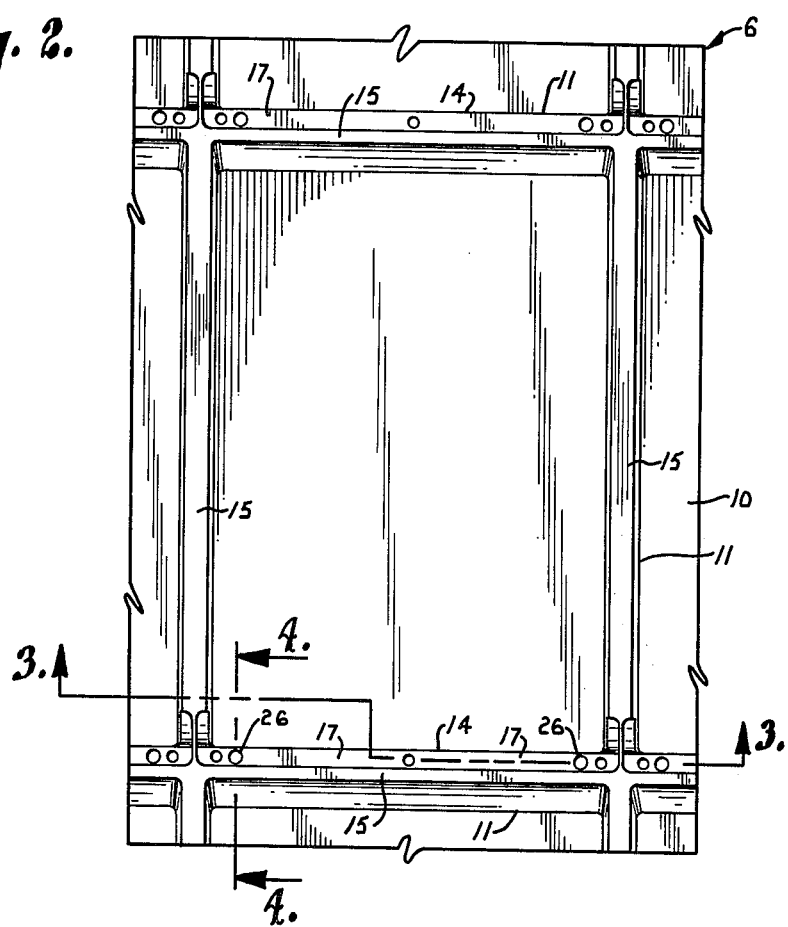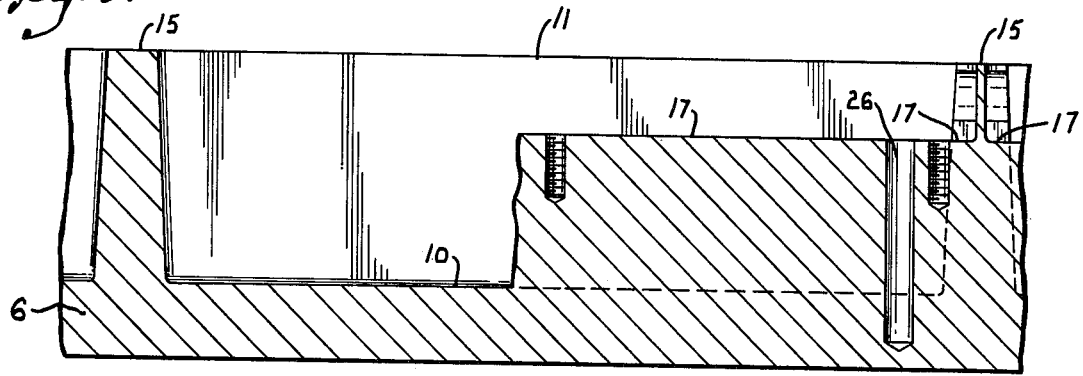

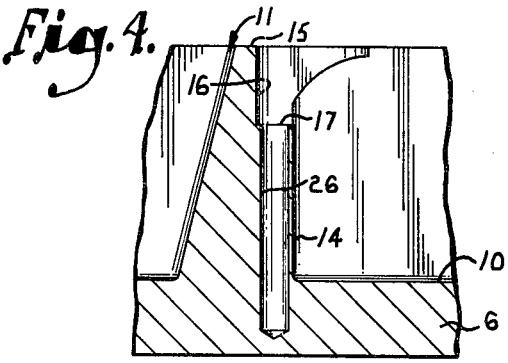
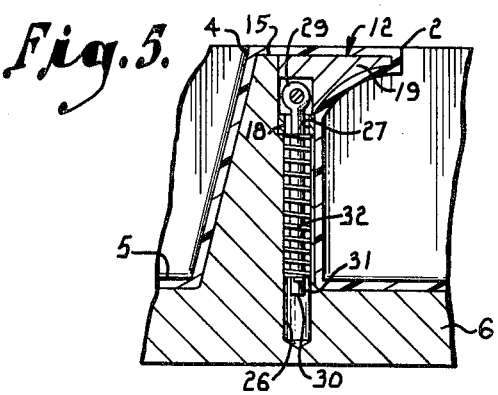
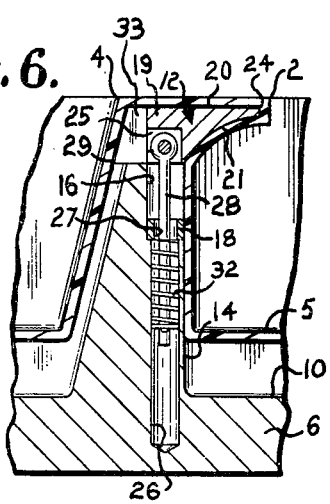
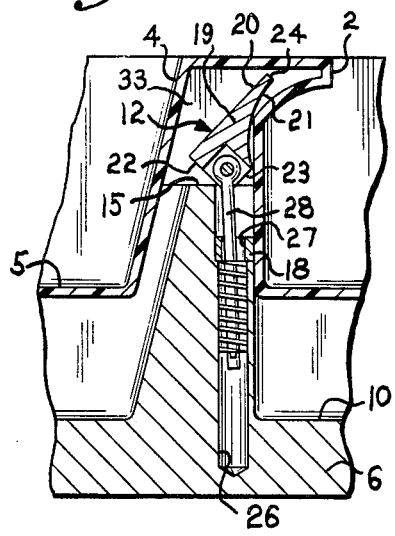
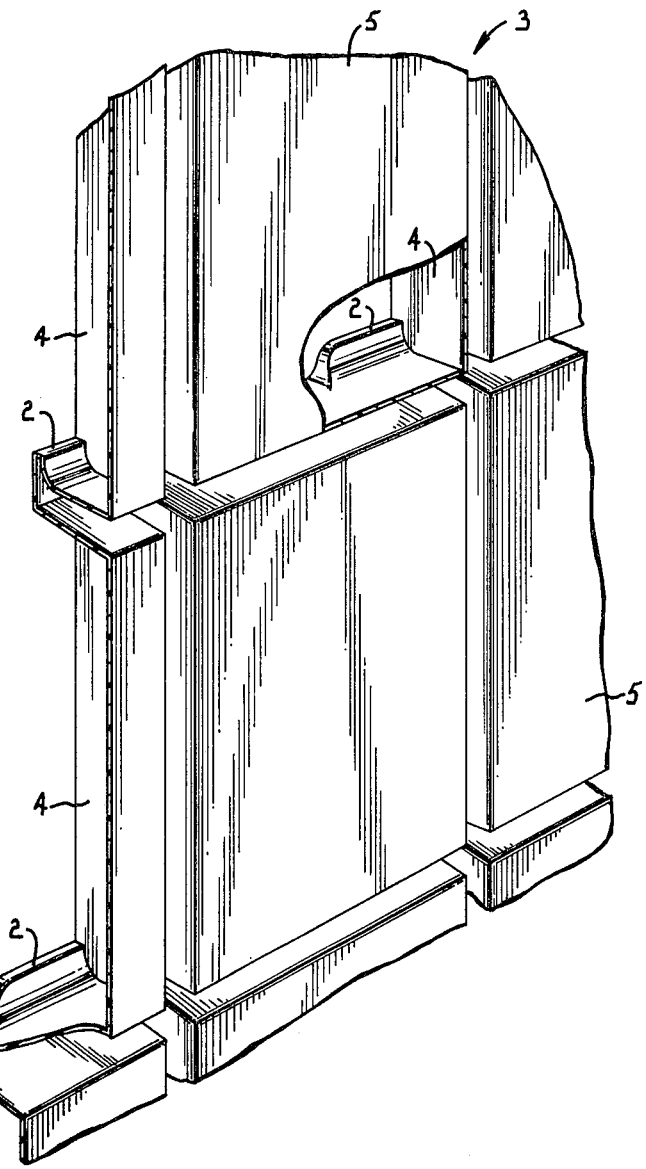

MOLD FOR FORMING A PLASTIC ARTICLE HAVING AN UNDERCUT OR NEGATIVE DRAFT PORTION

The present invention relates to molds for forming plastic articles in vacuum molding and more particularly to such a mold for forming a plastic article having an undercut hollow projection or a negative draft in article wall portion.

The principal objects of the present invention are: to provide a mold for forming a plastic article having an undercut on a negative draft portion; to provide such a mold for vacuum forming of articles having hollow projections extending outwardly from at least one article wall which is substantially normal or perpendicular to a rear wall of the article so that the rear wall and the projection are in facing relation; to provide such a mold including projection forming members resiliently and hingedly mounted on and extending outwardly from certain of the mold walls so that partial separation of the main mold member from the article provides a cavity permitting retraction movement of the projection forming members and further separation permits pivotal movement and removal of said projection forming members from the respective hollow projection during separation of the plastic article and the mold; to provide such a mold wherein the hollow projection, undercut or negative draft is adjacent a portion of the article having narrow wall spacing; to provide such a mold wherein the hollow projection or a negative draft extends outwardly from both walls of adjacent intersecting walls of the formed plastic article; and to provide such a mold which is economical to manufacture, durable in construction and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the mold for forming a hollow projection with a negative draft.

FIG. 1 is a side elevational view of a mold embodying features of the present invention and operative to form a plastic article having a hollow projection with a negative draft.

FIG. 2 is an enlarged fragmentary top plan view of a mold member of the mold.

FIG. 3 is an enlarged fragmentary longitudinal sectional view through a mold wall and taken on line 3—3 of FIG. 2.

FIG. 4 is an enlarged fragmentary transverse sectional view through a mold wall and taken on line 4—4 of FIG. 2.

FIG. 5 is an enlarged fragmentary transverse sectional view similar to FIG. 4 except having projection forming members thereon and walls of a formed plastic article in engagement therewith.

FIG. 6 is an enlarged fragmentary transverse sectional view similar to FIG. 5 except showing the mold member partly separated from the formed plastic article a distance to define a cavity for initial retractive movement of the projection forming member in preparation for further separation movement.

FIG. 7 is an enlarged fragmentary transverse sectional view similar to FIG. 6 except showing the mold member further separated from the formed plastic article and the projection forming member moved into the enlarging cavity.

FIG. 8 is a perspective view of the formed plastic article with portions broken away to better illustrate the shape thereof.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a mold for forming a hollow projection 2, undercut, or negative draft in a plastic article 3, such as a rack, wherein the hollow projection 2 extends outwardly from an article wall 4 which is substantially normal to a rear wall 5 of the article 3 so that the projection 2 and rear wall 5 are in facing relation. The mold 1 may be any suitable type for vacuum forming and may be either stationary or rotary. The mold 1 includes a mold member 6 and is operative to vacuum form a plastic sheet 7 into a semi-rigid plastic article 3. The mold member 6 and the plastic sheet 7 may be heated and cooled during various portions of the vacuum forming process to aid in forming the article from the plastic sheet 7 and release of the formed article 3.

In the example shown the mold 1 includes a frame 8 for holding peripheral edges of the plastic sheet 7 and positioning same in covering relation to a cavity of the mold member 6. The mold 1 structure includes a heater or plate 9 adjacent the plastic sheet 7 for heating same. The mold member 6 includes a mold surface 10 and walls 11 extending therefrom for defining the cavity and forming the rear wall 5 and article walls 4 respectively of the plastic article 3. Projection forming members 12 are resiliently and hingedly mounted on and extend outwardly from certain of the mold walls 11 so that the projection forming members 12 are removable from the respective hollow projection 2 during separation of the formed article 3 from the mold member 6.

The mold 1 includes means on the mold member 6 and the sheet holding frame 8 operative to move the plastic sheet 7 into engagement with the mold member 6. The frame 8 is arranged to hold the plastic sheet in sealing engagement with outer margins of the mold member 6 and when the plastic sheet is heated to a substantially flowable or formable condition a vacuum is formed in the cavity or space between the mold surface 10 and the heated plastic sheet 7 so that the plastic sheet 7 is drawn into contact with the mold surface 10, walls 11, and projection forming members 12 thereby forming the plastic article 3.

The mold member walls 11 are arranged along peripheral edges of the mold member 6 and in a grid pattern so that the walls 11 and the mold surface 10 cooperate to form a plurality of cavities or compartments each suitable for receiving articles to be displayed. The hollow projections 2 cooperate with the walls 4 and 5 of the article 3 so that the articles to be displayed are retained in the respective cavities or compartments.

The mold walls or cavity defining walls 11 each include at least one cavity facing surface 14 and an end surface 15 each engageable by the plastic sheet 7. Certain of the mold walls 11 include an abutment surface 16 extending from the end surface 15 and a shoulder 17 extending between abutment surface 16 and from the respective cavity facing surface 14 thereof. The shoulder 17 and abutment surface 16 are positioned to define an angle of approximately 90° therebetween.

The mold walls 11 each have at least a conventional draft to aid in removal from the respective article wall 4. In the illustrated embodiment, each cavity facing surface or surfaces 14 of the mold walls 11 and the mold surface 10 are positioned to define an angle therebetween of greater than 90°, such as at least 92°, so that the mold member walls 11 may be removed from the respective article wall 4.

The projection or undercut forming means 12 are resiliently and hingedly mounted on and extend outwardly from certain of the mold walls 11 so that the projection forming means 12 are removable from the respective hollow projection 2 during separation of the formed article 3 from the mold member 6. In the illustrated embodiment, the projection forming means 12 include a sill portion or member 18 mounted on the shoulder 17 of the certain mold walls 11, as by a plurality of longitudinally spaced screws with countersunk heads. The projection forming means 12 also includes a flipper portion or member 19 in overlying relation with the sill member 18.

The flipper members 19 each have first and second sheet engaging surfaces 20 and 21 which, when positioned in normal projection forming position, extend from the cavity defining or mold walls end surface 15 and the cavity facing surface 14 respectively. The flipper members 19 each have an abutment engaging surface 22 and a sill engaging surface 23 extending from the first and second sheet engaging surfaces 20 and 21 respectively.

The wall end surface 15 and the first sheet engaging surface 20 of the flipper 19 are in substantial alignment when the flipper 19 is in the projection forming position. The second sheet engaging surface 21 extends in an arcuate path from a flipper edge 24 toward the sill engaging surface 23 so that the flipper 19 tapers from the flipper edge 24 thereby becoming thicker as the distance from the edge 24 increases. The second sheet engaging surface 21 is tangent to the cavity facing surface 14 of the respective mold wall 11 when the flipper 19 is in the projection forming position.

The mold includes means connecting the mold member walls 11 and the respective projection forming means 12 for permitting removal of the projection forming means 12 from the respective hollow projection 2 during separation of the formed plastic article 3 and the mold member 6. In the illustrated embodiment, each flipper includes means defining a plurality of longitudinally spaced recesses or notches 25 each extending from the abutment engaging surface 22 and the sill engaging surface 23 thereof. The cavity defining or mold walls 11 having the respective sill members 18 mounted thereon include means defining a plurality of longitudinally spaced elongated recesses 26 extending from the shoulder 17 thereof. The flipper notches 25 and the wall recesses 26 are each arranged to be in alignment with a respective aperture 27 through the respective sill member 18.

A plurality of spaced hinge pins 28 are each positioned in a respective one of the shoulder or wall recesses 26 and extend through the respective sill member aperture 27 and are pivotally connected to the adjacent flipper member 19, thereby forming an axis of rotation parallel to the longitudinal dimension of the flipper portion 19. Each aperture 27 is greater in dimension than the margin of the hinge pin 28 at least in a direction transverse to the axis of the hinge means. This space between the aperture wall and the pin margin permits the pin 28 to rock transversely within the aperture 27 and thereby guide a transverse movement of the flipper portion 19. Each hinge pin has a head portion 29 received in a respective one of the flipper notches 25.

The hinge pins 28 each include resilient means engaging same and the respective sill portion 18 adjacent a respective aperture 27 therethrough for permitting separation of the flipper portion or member 19 from the sill member 18 and for urging the flipper 19 toward the sill member 18. The illustrated embodiment, the hinge pins 28 each have an elongated shaft portion 30 having an enlarged portion or abutment 31 thereon and spaced from the head portion 29 thereof. A plurality of suitable resilient members 32, such as compression springs are each sleeved on the shaft portion 30 of a respective one of hinge pins 28 and extend between and are in engagement with the respective hinge pin abutment 31 and the sill member 18.

The hinge pins 28, extended through the aperture 22, and the resilient members 32 cooperate to rockingly guide the flipper portion 19 rearwardly so that the abutment engaging surface 22 deflects from the wall end surface 15 upon removal of a formed article, and automatically reset the flipper portion 19 in a position to form the respective hollow projection 2.

The mold member 6 may be heated during forming of the plastic sheet 7. The mold member 6 is preferably formed of a material, such as aluminum, which is quickly heated and cooled. Heating may be by any conventional method or device. The mold member 6 may be quickly cooled, as by airflow through suitable air passages. The mold 1 includes suitable means for effecting separation of the formed plastic article 3 and the mold member 6, as by flow of air through suitable air passages, such as those used to effect a vacuum thereby cooling the mold member 6.

FIGS. 5, 6 and 7 illustrate the flipper portion 19 and its movement during separation of the mold member 6 and the formed plastic article 3. As the mold member 6 is first started to be separated from the formed plastic article 3, the flipper portion 19 remains in position in the hollow projection 2 and a cavity 33 is formed which provides the space to receive the flipper portion 19 during rotation thereof upon continued separation of the mold member 6 and the formed plastic article 3. FIG. 6 illustrates the cavity formed during the initial separation movement and at the position shown the flipper portion 19 starts to retract from the mold position. The retractive movement is to the left as shown in FIG. 6 into the cavity above the surface 15. The movement of the mold member 6 continues from the position shown in FIG. 6 and the flipper portion 19 pivots and can be retracted from the mold position during further separation of the mold 6 from the article 3. FIG. 7 illustrates further rotation of the flipper portion 19 during said further separation. After the mold 6 is completely separated from the plastic article 3 the flipper portions 19 automatically return to molding position as shown in FIG. 5 due to the springs 32 returning the flipper members into engagement with the surface 16 and member 18.

The plastic article 3 formed by the mold 1 is illustrated in FIG. 8. The plastic article 3 includes the rear wall 5 and an article wall 4 adjacent or defining peripheral edges of the formed article 3. The article walls 4 are also arranged in a grid pattern with the hollow projection 2 extending laterally outwardly from certain of the intersecting walls 4 thereby defining tabs or short walls in facing relation with the rear wall 5 so that the tabs are engageable by items to be displayed in the respective cavities or compartments of the formed plastic article 3.

It is to be understood that while we have illustrated and described one form of our invention, it is not to be limited to the specific form or arrangement of parts herein described and shown.

What we claim and desire to secure by Letters Patent is:

1. A mold for forming articles having undercut or negative draft portions and comprising:
   (a) a vacuum forming mold having a base wall and an upstanding wall member including an abutment surface, a wall end surface, and a shoulder having an elongated recess therein, thereby defining a mold cavity;
   (b) an undercut defining mold member positioned on and projecting outwardly from said upstanding wall member for forming a hollow projection in an article formed from a plastic sheet, said undercut defining mold member comprising:
      (1) a projecting flipper portion having an abutment engaging surface, a sill engaging surface, and a sheet engaging surface;
      (2) a sill portion mounted on said shoulder and underlying said flipper portion, said sill portion having an aperture extending therethrough and aligned with said recess;
      (3) an elongated pin extended through said aperture and having hinge means pivotally connecting said pin to said flipper portion, resilient means engaging said pin and urging said pin longitudinally through said aperture toward said base wall, said aperture being greater in dimension than said pin at least in a direction transverse to the axis of said hinge means thereby providing clearance for rocking with guidance of said pin during movement of said flipper portion toward and away from said sill portion, whereby said abutment engaging surface deflects from said wall end surface upon removal of a formed article, and automatically returns said flipper portion into engagement with said sill portion.

2. A mold as set forth in claim 1 wherein:
   (a) said resilient means are sleeved on said pin.

* * * * *